Patented Feb. 22, 1944

2,342,526

UNITED STATES PATENT OFFICE 2,342,526

METHOD OF MAKING SPONGE RUBBER

Robert O. Borton, Cambridge, Mass., assignor to United States Rubber Company, New York, N. Y., a corporation of New Jersey No Drawing. Application April 22, 1942, Serial No. 440,090

14 Claims. (Cl. 260—723)

This invention relates to a method of making sponge rubber and more particularly to a method of making sponge rubber from foamed latex.

Sponge rubber has been produced by converting latex into a foam, shaping the foam and coagulating the latex in the foam, as by gelling, to form sponge rubber. There are many known methods of preparing stable uncoagulated latex foams which after shaping may be readily converted into sponge rubber. For example, air may be bubbled into a body of latex containing a foam stabilizing agent, such as soap, and the resultant foam may be agitated to subdivide the bubbles and form a stiffer foam. The air may be beaten into a compounded latex by means of a suitably designed apparatus similar to a cake mixer or egg beater. The latex may be foamed by means of a gas generated in situ, either by the decomposition of a chemical compound such as hydrogen peroxide, or by the interaction of two or more chemicals to form a gas as by the reaction between a carbonate and an acid, or by the reaction between an active metal and a base, as the reaction between powdered magnesium and potassium hydroxide. The latex may be foamed by applying a vacuum to a container containing a latex which is capable of being frothed under reduced pressure by escape of gas dissolved in the latex or by production of gas in the latex as by chemical decomposition or heating. A latex compound may be foamed by impregnating it with a gas under pressure such as nitrous oxide or carbon dioxide and subsequently releasing the pressure.

The latex foamed by any of these known methods may be shaped, as by pouring into molds having the proper size and configuration, following which the latex in the foam may be coagulated to form sponge rubber by causing the foam to gel or set. If desired, the foam may be gelled in the apparatus in which it is formed. The gelling of the latex foam may be brought about in a variety of ways. There may be added to the latex, either before or after it is foamed, certain heat-sensitizing agents, which act to cause a latex compound to coagulate or gel when it is heated above some critical temperature. Among such known heat-sensitizing agents are the di- and tri-valent metal salts, complex zinc-ammonia salts, ammonium salts of strong acids, certain aryl substituted guanidines, easily hydrolyzable esters, ammonium persulfate, and the salts of fluosilicic acid. Certain sensitizing agents, notably the alkali metal silico fluorides, possess the useful property of causing a latex foam to gel at room temperature after a lapse of time which is inversely dependent upon the amount of sensitizer added. After gelling of the foam, at room or elevated temperature, the thus formed sponge may be partially or completely vulcanized in the mold or other shaping apparatus, removed therefrom, and dried.

It has been found in previous practice that the addition of any large amount of inert filler material to the latex compound so reduces the wet coagulum strength of the gelled foam that even after vulcanizing it is extremely difficult to remove from the molds or other shaping apparatus without tearing. Further, the addition of more than about 20 parts of filler material per 100 parts of rubber unduly reduces the flexing resistance of the finished sponge article.

The present invention comprises the treatment of the latex before foaming and considerably increases the toughness of the foam structure and wet coagulum strength of the foam after gelling, and also increases the flexing resistance of the finished sponge. By the present invention, the physical properties of pure gum stock and loaded sponge products have been improved, and it is possible to make sponge rubber articles containing 200 or more parts of filler material per 100 parts of rubber that have sufficient wet coagulum strength to allow the gelled sponge to be readily removed from the molds without tearing, and that have adequate flexing resistance in the finished article for various uses.

In carrying out the present invention, the latex is heated in the presence of a small amount of a tanning or protein precipitating agent, such as tannic acid, tannin, gallatonic acid, and digallic acid, at a temperature above 100° F. for at least four hours before converting into a foam and coagulating to form sponge rubber in the usual manner. The treatment with the tanning agent takes place before converting the compounded latex into a foam and before or after the addition of the various compounding and filler materials to the latex. The preferred amounts of tanning agent are .1 to .5 part per 100 parts solids in the rubber latex, but a smaller proportion may be used with at least some of the advantages of the present improvement, and larger amounts do not detrimentally affect the product. .5 part of a tanning agent, such as tannic acid, appears sufficient to produce the desired improvement on heating of the latex. The improvement of the present invention may be obtained with latices preserved in various manners, for example, latex preserved with ammonia alone, or latices preserved with ammonia and a small amount of a germicidal agent, such as formaldehyde, hydroxylamine, alkyl mercury ester, arsenic oxide, sodium pentachlorphenate, or the like. The latex should be heated to above 100° F. for at least four hours. A temperature between 100 and 120° F. is satisfactory although higher temperatures may be used if the latex is not unduly destabilized thereby. The treatment with tanning agent at elevated temperatures should be for at least four hours and may readily be continued for twenty-four or even forty-eight or more hours, if desired. Various filler materials which have been used with latices and which have shown the improved properties according to the present invention include barytes, clay, whiting, ground silica, and the like.

In the application of William J. Clayton, Serial No. 400,799, filed July 2, 1941, there is disclosed a method for heating latex before foaming with a small amount of formaldehyde in order to increase the wet coagulum strength of the foam after gelling and increase the flexing resistance of the finished sponge. The present improvement by treatment of the latex at elevated temperatures with tannic acid may be used in addition to the treatment with formaldehyde, as set forth in the above referred Clayton application, and a stronger foam results from the heat treatment in the presence of tannic acid and formaldehyde than in the case of the heat treatment with formaldehyde alone.

The example below illustrates the process of the present invention. A compound of the following formula was prepared:

Latex: Parts by weight
Rubber ........................................ 100
Water ......................................... 60
Ammonia ...................................... .6
Tannic acid (as 20% aqueous solution) .... .1
Potassium oleate (as 20% aqueous solution) ........................................ .5

The latex used was ammonia preserved Hevea latex which had been concentrated by centrifuging. The potassium oleate acted as a stabilizer for the latex during heating. The latex was placed in a suitable container and heated between 100 and 120° F. for twelve hours, after which it was allowed to come to room temperature. After this treatment there was added to the latex, for every 100 parts by weight of dry rubber content, a composition comprising 3 parts by weight (wet) of a 35% aqueous solution of castor oil soap, 12 parts by weight (wet) of an 82% aqueous paste of barytes, 1.5 parts by weight (wet) of a 60% aqueous paste of sulphur, .75 part (wet) of a 50% aqueous paste of zinc diethyl dithiocarbamate, and 1.2 parts (wet) of a 34% aqueous paste of zinc mercapto benzothiazol. The castor oil soap is a foaming agent, and the last two named compounds accelerators. The compounded latex was then placed in an electrically driven cake mixer and air was beaten into the compound until the desired foam density was obtained. There was then thoroughly stirred into the foam 10 parts (wet) of a 35% aqueous paste of zinc oxide and 2 parts (wet) of a 50% aqueous paste of sodium silico fluoride for every 100 parts of dry rubber content. The foam was then poured into suitably shaped molds and allowed to gel at room temperature (about 80° F.), the foam gelling in about eight minutes. The gelled sponge while still in the molds was vulcanized in air and steam at 212° F. for thirty minutes. After vulcanization the wet sponges were stripped from the molds without difficulty, dewatered in a centrifugal drier, and dried in a current of dry air at 180° F. for four hours.

Other runs were made using various amounts of tannic acid up to 1 part with similar amounts of other tanning agents, and with amounts of loading materials up to 100 parts of the loading material per 100 parts of rubber in the latex, and at different times of heating at over 100° C. for four to forty-eight hours. The final sponge rubber product in all these cases had a definitely higher flexing resistance than similar compounded sponge without the preliminary treatment of the latex with the tanning agent at elevated temperature.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of making sponge rubber which comprises adding to latex up to 1 part of material selected from the group consisting of tannic acid, tannin, gallatonic acid, and digallic acid per 100 parts of rubber solids of the latex, heating without coagulation at a temperature above 100° F. for at least four hours, converting the latex into a foam, and coagulating the latex in the foam to form sponge rubber.

2. The method of making sponge rubber which comprises adding to latex up to 1 part of material selected from the group consisting of tannic acid, tannin, gallatonic acid, and diagallic acid per 100 parts of rubber solids of the latex, heating without coagulation at a temperature above 100° F. for at least four hours, beating the latex into a foam, and coagulating the latex in the foam to form sponge rubber.

3. The method of making sponge rubber which comprises adding to latex .1 to .5 part of material selected from the group consisting of tannic acid, tannin, gallatonic acid, and digallic acid per 100 parts of rubber solids of the latex, heating without coagulation at a temperature above 100° F. for at least four hours, beating the latex into a foam, and coagulating the latex in the foam to form sponge rubber.

4. The method of making sponge rubber which comprises adding to latex up to 1 part of material selected from the group consisting of tannic acid, tannin, gallatonic acid, and digallic acid per 100 parts of rubber solids of the latex, heating without coagulation at a temperature above 100° F. for at least four hours and compounding the latex with at least 10 parts filler material per 100 parts of rubber solids of the latex, converting the latex into a foam, and coagulating the latex in the foam to form sponge rubber.

5. The method of making sponge rubber which comprises adding to latex up to 1 part of material selected from the group consisting of tannic acid, tannin, gallatonic acid, and digallic acid for 100 parts of rubber solids of the latex, heating without coagulation at a temperature above 100° F. for at least four hours and compounding the latex with at least 10 parts filler material per 100 parts of rubber solids of the latex, beating the latex into a foam and coagulating the latex in the foam to form sponge rubber.

6. The method of making sponge rubber which comprises adding to latex .1 to .5 part of material selected from the group consisting of tannic acid, tannin, gallatonic acid, and digallic acid per 100 parts of rubber solids of the latex, heating without coagulation at a temperature above 100° F. for at least four hours and compounding the latex with at least 10 parts filler material per 100 parts of rubber solids of the latex, beating the latex into a foam, and coagulating the latex in the foam to sponge rubber.

7. The method of making sponge rubber which comprises adding to latex up to 1 part of tannic acid per 100 parts of rubber solids of the latex and heating without coagulation at a temperature above 100° F. for at least four hours, converting the latex into a foam, and coagulating the latex in the foam to form sponge rubber.

8. The method of making sponge rubber which comprises adding to latex up to 1 part of tannic acid per 100 parts of rubber solids of the latex and heating without coagulation at a temperature above 100° F. for at least four hours, beating the latex into a foam, and coagulating the latex in the foam to form sponge rubber.

9. The method of making sponge rubber which comprises adding to latex .1 to .5 part of tannic acid per 100 parts of rubber solids of the latex and heating without coagulation at a temperature above 100° F. for at least four hours, converting the latex into a foam, and coagulating the latex in the foam to form sponge rubber.

10. The method of making sponge rubber which comprises adding to latex .1 to .5 part of tannic acid per 100 parts of rubber solids of the latex and heating without coagulation at a temperature above 100° F. for at least four hours, beating the latex into a foam, and coagulating the latex in the foam to form sponge rubber.

11. The method of making sponge rubber which comprises adding to latex up to 1 part of tannic acid per 100 parts of rubber solids of the latex, heating without coagulation a a temperature above 100° F. for at least four hours and compounding the latex with at least 10 parts filler material per 100 parts of rubber solids of the latex, converting the latex into a foam, and coagulating the latex in the foam to form sponge rubber.

12. The method of making sponge rubber which comprises adding to latex up to 1 part of tannic acid per 100 parts of rubber solids of the latex, heating without coagulation at a temperature above 100° F. for at least four hours and compounding the latex with at least 10 parts filler material per 100 parts of rubber solids of the latex, beating the latex into a foam, and coagulating the latex in the foam to form sponge rubber.

13. The method of making sponge rubber which comprises adding to latex .1 to .5 part of tannic acid per 100 parts of rubber solids of the latex, heating without coagulation at a temperature above 100° F. for at least four hours and compounding the latex with at least 10 parts filler material, converting the latex into a foam, and coagulating the latex in the foam to form sponge rubber.

14. The method of making sponge rubber which comprises adding to latex .1 to .5 part of tannic acid per 100 parts of rubber solids of the latex, heating without coagulation at a temperature above 100° F. for at least four hours and compounding the latex with at least 10 parts filler material, beating the latex into a foam, and coagulating the latex in the foam to form sponge rubber.

ROBERT O. BORTON.